United States Patent Office 3,514,405
Patented May 26, 1970

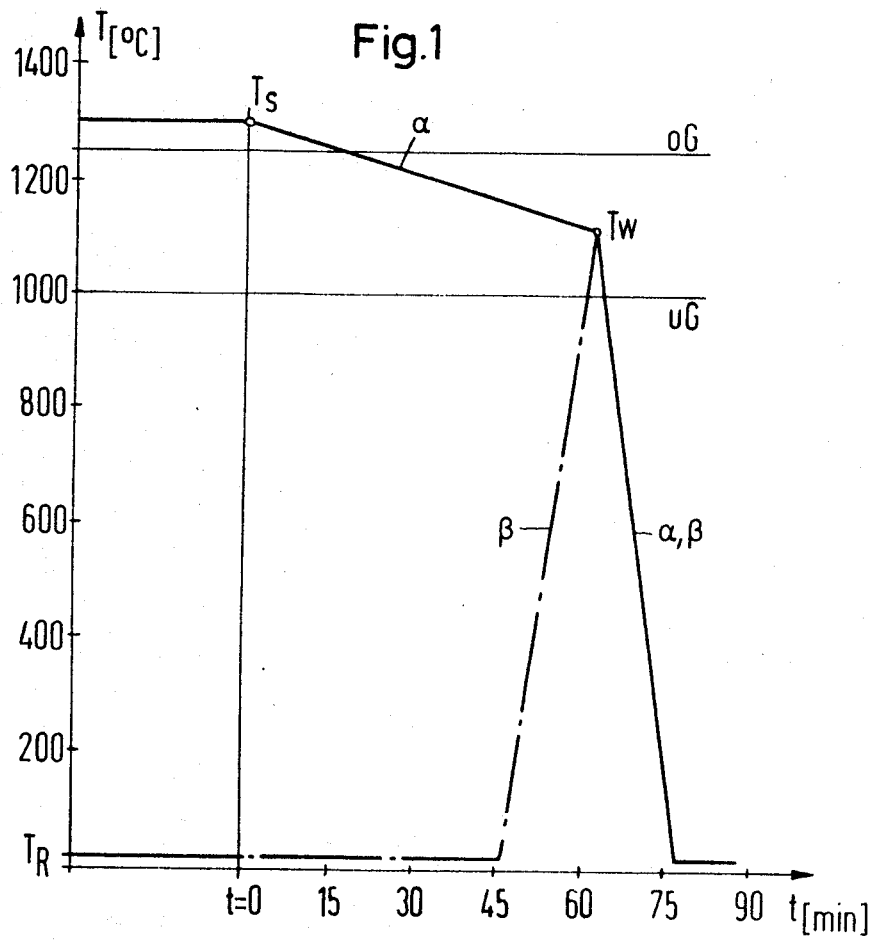
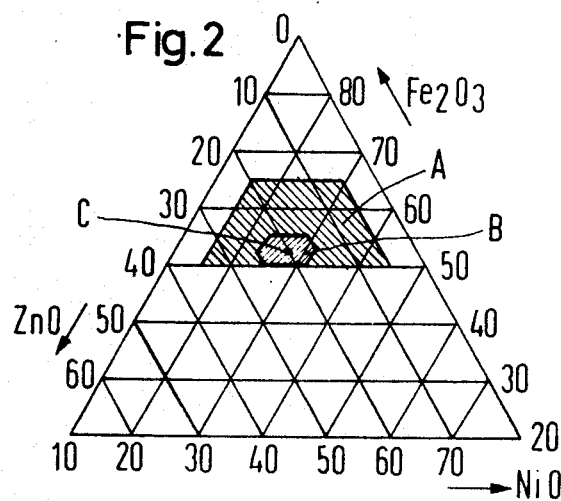

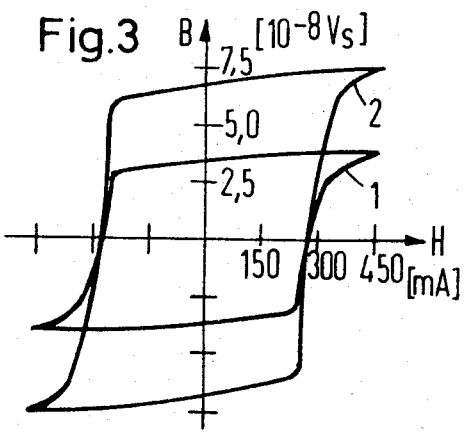
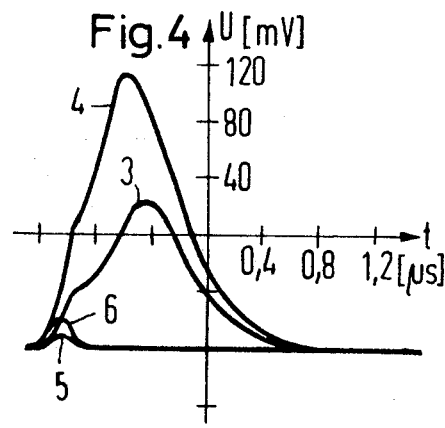
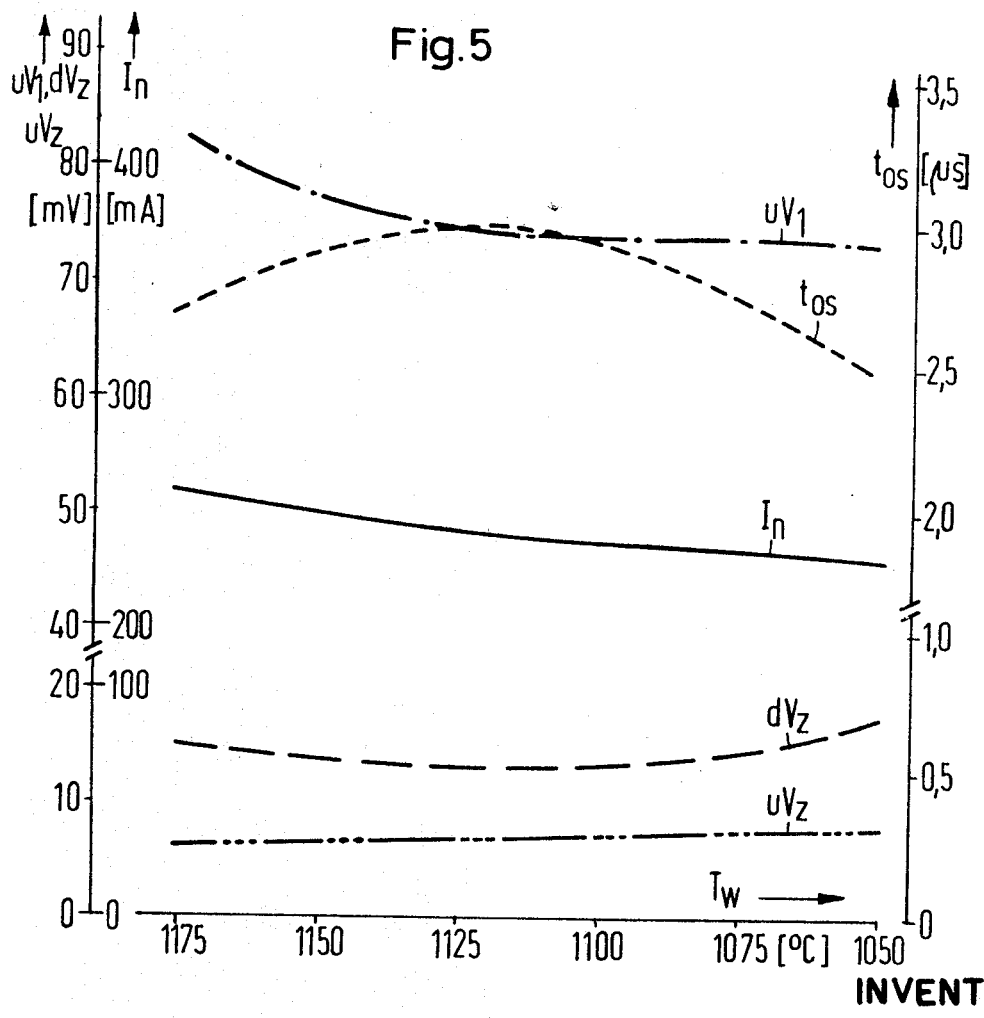

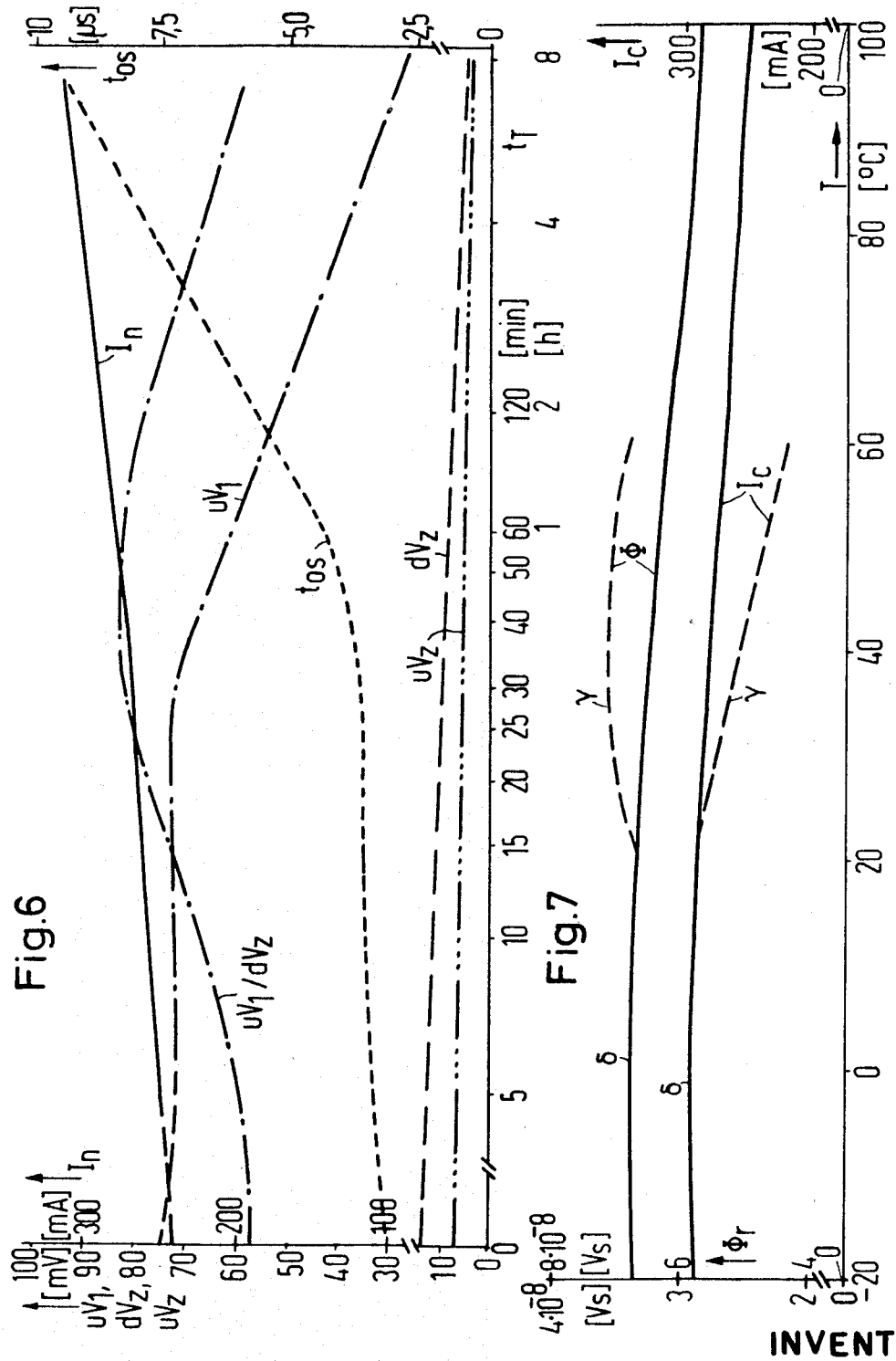

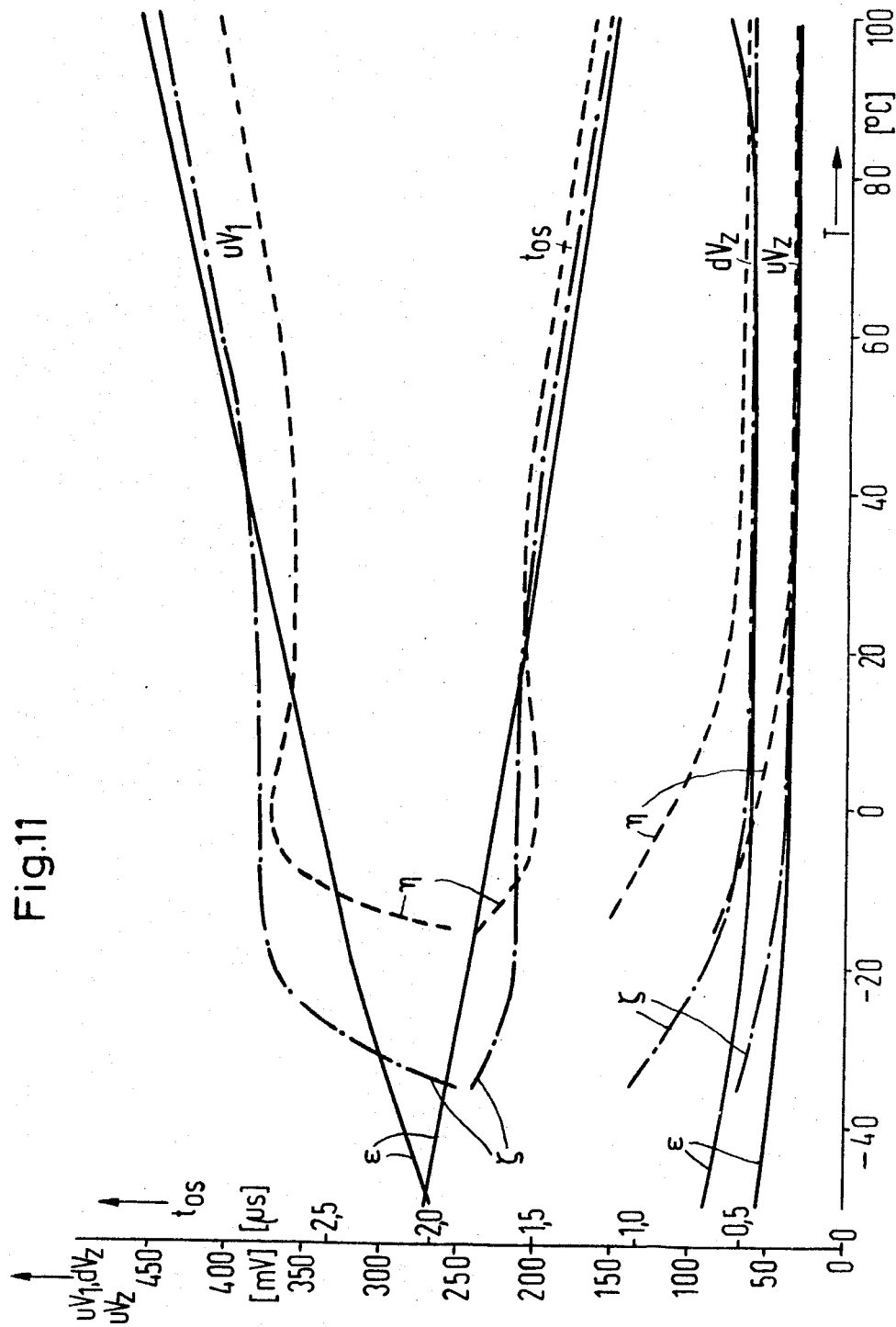

3,514,405
FERROMAGNETIC SWITCHING CORE OF FERRITE WITH RECTANGULAR HYSTERESIS LOOP AND PROCESS FOR THE PRODUCTION THEREOF
Helmut Rabl, Munich, and Ferdinand Neubauer, Garching, Germany, assignors to Siemens Aktiengesellschaft, a corporation of Germany
Filed Aug. 3, 1966, Ser. No. 569,888
Claims priority, application Germany, Aug. 10, 1965, S 98,761
Int. Cl. C04b 35/30
U.S. Cl. 252—62.62         12 Claims

ABSTRACT OF THE DISCLOSURE

Ferromagnetic switching cores having rectangular hysteresis loops, a remanence inductance of approximately 3 kg., and a coercive field strength of less than 0.75 oe. are produced by a process in which the cores, after sintering, are cooled slowly to a critical turning temperature and then are cooled very rapidly to room temperature in the presence of nitrogen. Additionally, cores which have already been cooled may be heated to a temperature in the critical range and then cooled very rapidly in an oxygen-free atmosphere. The cores are nickel-zinc-cobalt-ferrite cores made up of a composition as follows:

50–55 mol percent $Fe_2O_3$
24–32 mol percent $NiO$
5–25 mol percent $ZnO$
0.5–0.8% by weight $CoO$.

---

The invention relates to a ferromagnetic switching core of ferrite, which has a rectangular hysteresis loop, as well as to a process for the production of such ferromagnetic cores.

Such switching cores are utilized in electronic apparatus as switching elements, and the nature of the rectangular hysteresis characteristics largely determine the quality of the switching properties. In switching cores a large ratio $uV_1/dV_z$ is desired, in which: $uV_1$ designates the maximal value of the signal of the undisturbed "1"; and $dV_z$ designates the maximal value of the signal of the disturbed "0." There is desired, moreover, a rapid response of the switching cores to the current impulses which are imposed thereon, with the switching time being designated as $t_{os}$. The switching time $t_{os}$ designates the time duration which occurs in the switching, measured between the respective values of 10% of the maximal voltage in the rising and in the falling branch. The switching time depends on the switching constant S of the ferromagnetic material as well as on the impulse field strength $\hat{H}$ and the starting field strength $H_0$ according to the following relation:

$$t_{os} = S/(\hat{H} - H_0)$$

The starting field strength $H_0$ corresponds approximately to the coercive field strength $H_c$. It is required, therefore, of such ferrite switching cores that the switching constant and also temperature dependence of the values determinative for the switching, for example the coercive field strength and the remanence induction, be small in the operating temperature range.

Therefore, the following main requirements are placed on switching cores. The ferromagnetic material should have a small coercive field strength, great remanence inductance and a low temperature dependence of the magnetic values over as large as possible a temperature range.

As compared to switching cores of metallic ferromagnetic strip material, ferrite cores are advantageously distinguished.

Among the ferrite cores with rectangular hysteresis loop there are known, on the one hand, so-called spontaneous rectangular ferrites, in which the rectangular hysteresis loop appears spontaneously after the cooling, subsequent to the sintering. Such ferrites are composed, in particular, of magnesium, manganese, zinc, and iron oxides. In consequence of the oxide constituent, such ferrites are rapidly cooled after the sintering, especially in nitrogen. These cores are distinguished by a relatively low coercive field strength of, for example, $H_c = 0.65$ oe. and a small switching constant, and are therefore utilized to particular advantage in circuits with high operating frequency. Their drawback is the relatively great temperature dependence of the switching characteristics, so that such switching elements must be provided with additional temperature compensation means when an exact reproducibility of certain switching processes over a relatively great temperature range of, for example, $-20°$ C. to $+100°$ C., is required.

In the second place, there are known so-called magnetic field tempered Perminvar ferrites, which acquire their rectangular characteristics only through tempering in a magnetic field parallel to the subsequent operating field. This magnetic field tempering takes place, according to prior teaching, at temperatures below the Curie temperature. This type of ferrite largely contains iron oxide along with a small amount of cobalt oxide and other oxides, such as nickel oxide, zinc oxide or the like. The advantages of such magnetic field tempered rectangular ferrites lie, above all, in the relatively low temperature dependence of their magnetic characteristics over relatively great temperature ranges. Heretofore a disadvantage has been the large switching constant of such magnetic field tempered rectangular ferrites, which in many cases prohibited their use with high speed counting and switching devices.

It has, however, already become a known process, through special control of the field tempering process, to reduce the switching constant of such ferrites to such an extent that they approximately correspond to the so-called rectangular ferrites on a magnesium-manganese basis. In the publication "Siemens-Zeitschrift" 1962, pages 60 to 67, the properties are described of such improved magnetic field tempered rectangular ferrites. The drawback of such ferrites, however, still lies in the fact that the smallest possible coercive field strength of these rectangular ferrites exceeds, by a multiple, the smallest possible coercive field strength of spontaneous rectangular ferrites on a manganese-magnesium basis. It was heretofore possible merely to reduce the coercive field strength of magnetic field tempered rectangular ferrites, on a nickel-zinc-cobalt basis, to values of about $H_c = 1.2$ oe. A further reduction of the coercive field strength in such switching cores for wide temperature range operation did not, heretofore, seem to be possible.

The problem underlying the invention lies in improving the switching properties of switching cores of ferrite, in particular, which can be utilized over a relatively large operating temperature range without an appreciable altering of their ferromagnetic properties, through a reduction of the coercitive field strength.

It has proved, surprisingly, that a coercive field strength of less than 0.75 oe. is achievable with a remanence induction of more than 3 kg. and a temperature coefficient of the remanence induction and the coercive field strength as well as of the switching time, of less than $5.10^{-3}/°$ C., over a temperature range from $-20$ to $+100°$ C., in a ferrite which has the following composition:

50–65 mol percent $Fe_2O_3$
15–55 mol percent NiO
5–35 mol percent ZnO as well as
0.1–4 percent weight of CoO Especially advantageous properties are yielded with a composition of 50–55, especially 52.5–53.5 mol percent $Fe_2O_3$
24–32, especially 26–30 mol percent NiO
15–25, especially 17–21 mol percent ZnO, as well as, in addition,
0.5–0.8 especially 0.55–0.65% by weight of CoO.

The ferrite may also have small amounts of manganese oxide.

Another development of the invention relates to a process for the production of ferromagnetic switching cores of ferrite with rectangular hysteresis loop of material corresponding to Perminvar ferrites, especially of cobalt containing superstoichiometric nickel-zinc-ferrite. The invention proceeds from the surprising concept that in such ferrites a magnetic field tempering is not absolutely necessary for the development of the rectangular characteristics.

According to the invention, the ferrite cores, at a temperature $T_W$ between 1250° C. and 1000° C., are cooled to about room temperature $T_R$ (about 20° C.) in an oxygen free atmosphere. The cooling is carried out rapidly, particularly advantageously in about 15 minutes.

It has proved that, through such an oxygen free neutral atmosphere, in the cooling from the critical temperature $T_W$ to room temperature $T_R$ the ferrite has no opportunity to change the degree of oxidation which it has at the critical temperature $T_W$. Neither an oxidation nor a reduction of the ferrite can take place. Although cooling processes in nitrogen especially and at a high speed are already known in the case of manganese containing ferrites, the use of such a "freezing" is new in the case of Perminvar basic material. If this freezing of the present state takes place in the temperature range between 1250° C. and 1000° C., especially at about 1115° C., the coercive field strength, quite surprisingly, is reduced to values for example around $H_c=0.2$–$0.7$ oe. The remanence induction is here relatively high amounting to about $B_r=3$ kg. and above, and further, the rectangularity relation fo such ferrite cores, produced according to the invention, is so considerable that such cores present very good switching properties even without a further magnetic field treatment. For still further improvement of the switching properties in a further development of the invention, there is carried out additionally a magnetic field tempering, but only for a relatively short time of less than two hours, preferably of about 15 minutes.

The ferrite switching cores according to the invention are superior to all rectangular ferrite switching cores heretofore known, both spontaneous and also field tempered cores.

Further details and features of the invention are explained in connection with the drawings, in which:

FIG. 1 is a cooling diagram illustrating cooling characteristics in connection with the material and process of the invention;

FIG. 2 is a three-substance diagram of a material embodying the invention;

FIG. 3 is a comparison diagram illustrating the hysteresis loops of a ferrite of prior type, and one embodiment of the invention;

FIG. 4 is a comparison diagram illustrating the impulse characteristics for such prior and new ferrites;

FIG. 5 is a chart illustrating the behaviod of ferrite cores embodying the invention;

FIG. 6 is a chart illustrating the switching characteristics of a switching core embodying the invention; and FIGS. 7 to 11 present comparisons between prior spontaneous rectangular ferrite cores of specific composition, and ferrites according to the invention independence upon temperature or upon the duration of tempering temperature.

Figure 8:
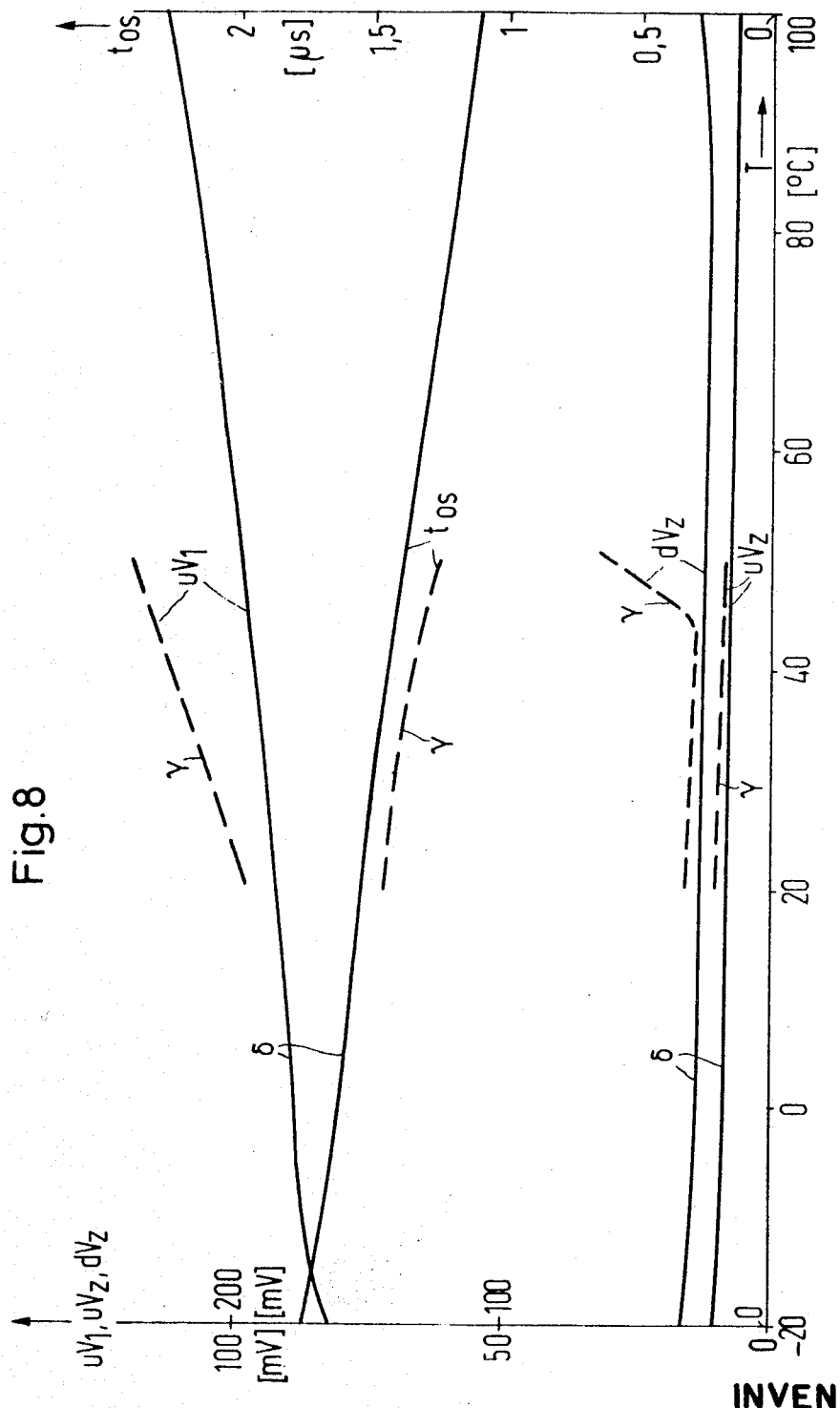

Referring to the three substance diagram $Fe_2O_3$, NiO, ZnO of FIG. 2, the letter A designates the range in hatched form to which ferrite switching cores according to the invention relate. Besides the nickel, zinc and iron-oxides, the core also contains, as previously stated, cobalt oxide in small proportions.

The letter B indicates the narrower range in which ferrites according to the invention present particularly advantageous properties, and the letter C indicates a composition which is especially advantageous. The composition comprises the following:

53 mol. percent $Fe_2O_3$
27 mol. percent NiO
20 mol. percent ZnO, as well as in addition, as
0.6 % by weight of CoO The mixture of these raw materials is pressed, according to processes already known, into ring cores. The pressed pieces are sintered at 1300° C. for 15 hours in air and thereupon cooled at a rate of about 3° C./min., which corresponds to 180° C./hr., to the critical turning temperature $T_W=1115°$ C. in air. According to the invention, at this temperature the atmosphere is shifted over to nitrogen and the cores are then very rapidly cooled to room temperature (normally about 20° C.) in about 15 minutes, which corresponds to a cooling rate of about 4400° C./hr. The cooling program is represented in FIG. 1 by the curve $\alpha$. The critical range in which the turning temperature $T_W$ must be established according to the invention lies between the lower limit $uG$ of 1000° C. and the upper limit $oG$ of 1250° C., while $T_S$ designates the sintering temperature. According to a further development of the invention, however, it is also possible to reheat cores of similar composition, which have already been cooled, according to the curve $\beta$, up to a temperature in the critical range and then to cool them, particularly very rapidly in an oxygen-free, neutral atmosphere.

Ferrite cores produced according to the described process and composed in accordance with point C in FIG. 2 have, for example, the following dimensions:

Outer diameter—$d_a=2$ mm.
Inner diameter—$d_i=1.3$ mm.
Height of ring cores—$h=0.6$ mm.

At an operating curernt of $I_f=240$ ma., and a partial current of $I_p=120$ ma., and $T_r=0.5$ $\mu s$. the following mean values of the voltage impulses are ascertained:

$uV_1=75$ mv.
$dV_z=13$ mv.; $uV_z=7$ mv.
$uV_1/dV_z=5.8$
$t_{os}=3\mu s.$

The coercive field strength of this material amounts to about $H_c=0.4$ oe., and the remanence inductance amounts to about $B_r=3.4$ kg.

In order to illustrate the technical advance in switching cores, according to the invention, over spontaneous switching cores on a manganese-magnesium ferrite basis, in FIGS. 3 and 4 there are compared the magnetization loops and also the impulse characteristics of both ferrites.

In FIG. 3 there is depicted the magnetization loop 1 of a material of the following composition:

40.5 mol. percent $Fe_2O_3$
26.0 mol. percent MgO
26.0 mol percent MnO
7.5 mol. percent ZnO as well as a magnetization loop 2 of a ferrite core according to the invention of the following composition:

53 mol. percent $Fe_2O_3$
29.5 mol. percent NiO
17.5 mol. percent ZnO
0.6% by weight of CoO.

From this it is evident that the switching core according to the invention has approximately the same low coercive field strength as the lowest coercivity manganese-magnesium rectangular ferrites heretofore known, but on the other hand, the ferrite core according to the invention has a considerably higher remanence inductance. Moreover, the rectangular core according to the invention has a considerably better temperature constancy than the manganese-magnesium rectangular ferirtes heretofore known according to curve 1.

In FIG. 4 curve 3 depicts the voltage signal of the undisturbed "1" ($uV_1$) of heretofore known manganese-magnesium rectangular ferrites corresponding to the composition of the example of curve 1 from FIG. 3, and curve 5 depicts the voltage curve of the undisturbed "0" ($uV_z$). The curves 4 and 6 depict the corresponding voltage signals of the ferrite according to the invention, described with respect to curve 2 of FIG. 3, in which the measurements are based on an operating current of $I_f$=470 ma. and a rise time of $T_r$=0.2 µs.

FIG. 5 illustrates the behavior of ferrite cores according to the invention, which has been described in connection with FIGS. 1 and 2, with reference to point C, within a range of the turning temperature $T_W$ between 1175 and 1050° C. The nominal current $I_n$ amounts, by definition, to 1.6 times the coercive current $I_c$. As is evident, optimal values are attainable for the turning temperature in a range between about 1130 and 1100° C. It is also there possible to achieve a minimum of the voltage $dV_z$. The conditions of the measurements were $I_{pw}/I_n$=0.5; $T_r$=0.5 µs., measuring temperature $$T_M = 25° C.$$

FIG. 6 depicts the switching characteristics of a switching core according to the invention, corresponding to point C in FIG. 2 and cooled according to the previously described process, in dependence upon the tempering time $t_T$, the tempering taking place in a magnetic field which acts parallel to the later working field of the switching cores at 280° C. It is apparent from FIG. 6 that the optimal useful voltage to interference voltage ratios $uV_1/dV_z$ are achievable with a tempering time of less than 4 hours. A tempering time of about 30 minutes is particularly advantageous.

FIGS. 7 to 11 present comparisons between prior spontaneous rectangular ferrite cores, on a manganese-magnesium basis, having a composition 40.5 mol. percent $Fe_2O_3$
26.0 mol. percent MgO
26.0 mol. percent MnO
7.5 mol. percent ZnO and ferrites according to the invention having a composition 53 mol percent $Fe_2O_3$
29.5 mol percent NiO
17.5 mol percent ZnO
0.6% by weight of CoO.

These ferrite switching cores have the following values:

$H_c$ (oe.) ---- 0.7
$B_r$ (kg.) ---- 3.5
S (µs. oe.) ---- 0.6
Curie temperature $T_c$ (° C.) ---- 410

FIG. 7 illustrates the dependence of the coercive current $I_c$ and of the remanence flux $\Phi r$ on the measuring temperature. The curves γ represent the above described already known manganese-magnesium ferrite; the curves δ represent the above described ferrite according to the invention.

Underlying the measurement was a current of I=470 ma. The cores have an external diameter of 2 mm. In a comparison of the two kinds of cores it will be directly noted that the switching core according to the invention has a significantly better, more constant temperature behavior. The mean temperature coefficient between −20 and +100° C. both with respect to the coercive current and with respect to the remanence flux amounts to only about −0.1%/degree C., i.e., $TK_{Ic}$, $TK_{Ir}$=10⁻³/degree C. There thus holds for the temperature coefficient for example of the coercive current the following relation:

$$TK_{Ic} = \frac{I_c(T_2) - I_c(T_1)}{I_c(T_1)\cdot(T_2-T_1)} = \frac{\Delta I_c}{I_c\cdot(T_2-T_1)}$$

FIG. 8 illustrates the dynamic characteristics of such ferrite cores in dependence on the temperature. The curve lines γ again relate to the manganese-magnesium ferrite already known, while the curves δ relate to the ferrite according to the invention. The following measuring conditions were maintained:

$I_f$=470 ma.
$I_p/I_f$=0.5
$T_r$=0.2 µs.

The considerable technical advance of the ferrite cores according to the invention also is directly apparent from FIG. 8.

Figure 9:
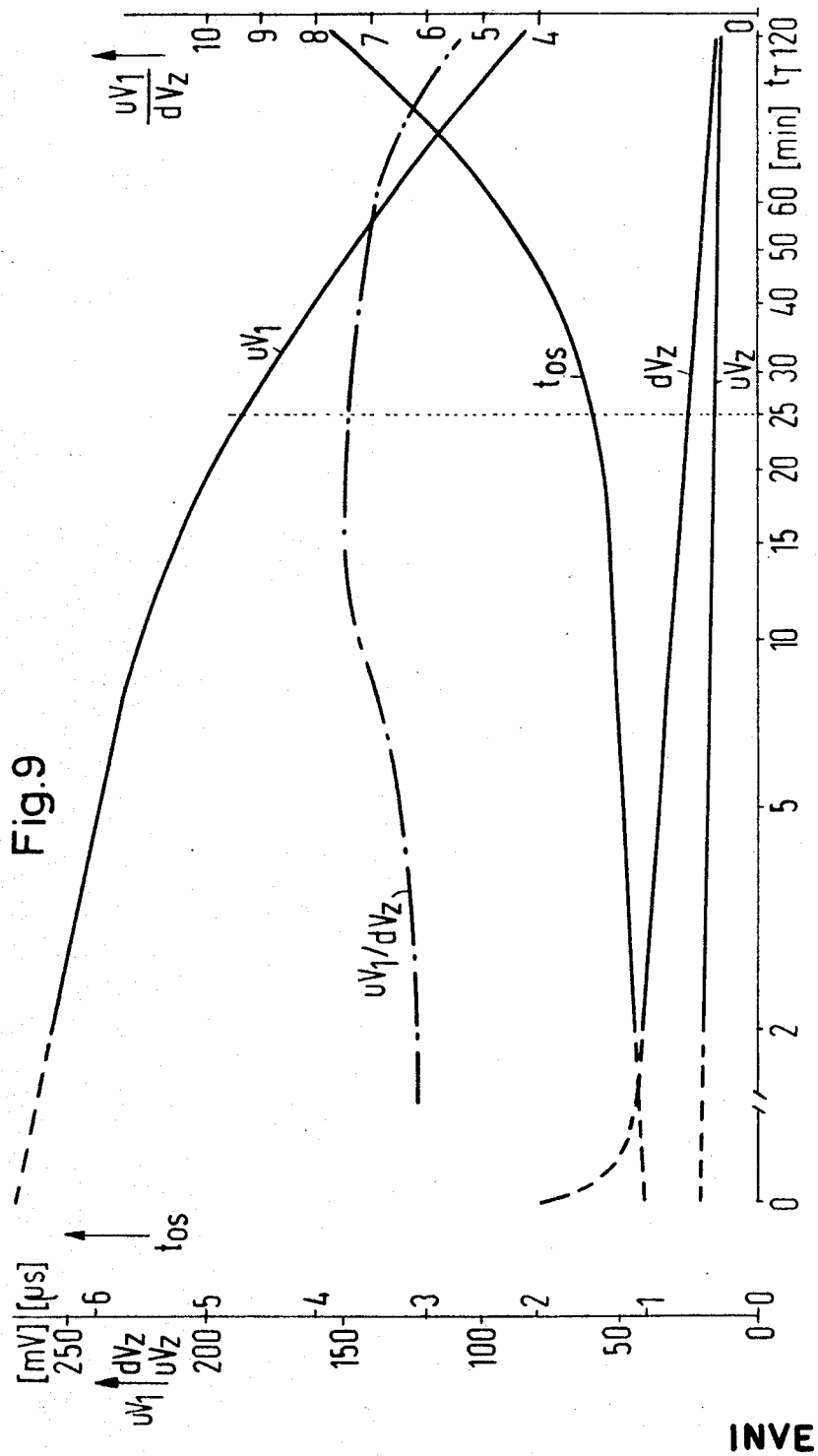

FIG. 9 presents dynamic characteristics of the ferrite core according to the invention, which was subjected, after the cooling, in accordance with the invention, to a tempering in the magnetic field at a tempering temperature of $T_T$=300° C. It is evident from this figure that the optimal values with respect to the useful interference voltage ratio and the switching time are achieved with relatively brief tempering of about 10 to 30 minutes.

Figure 10:
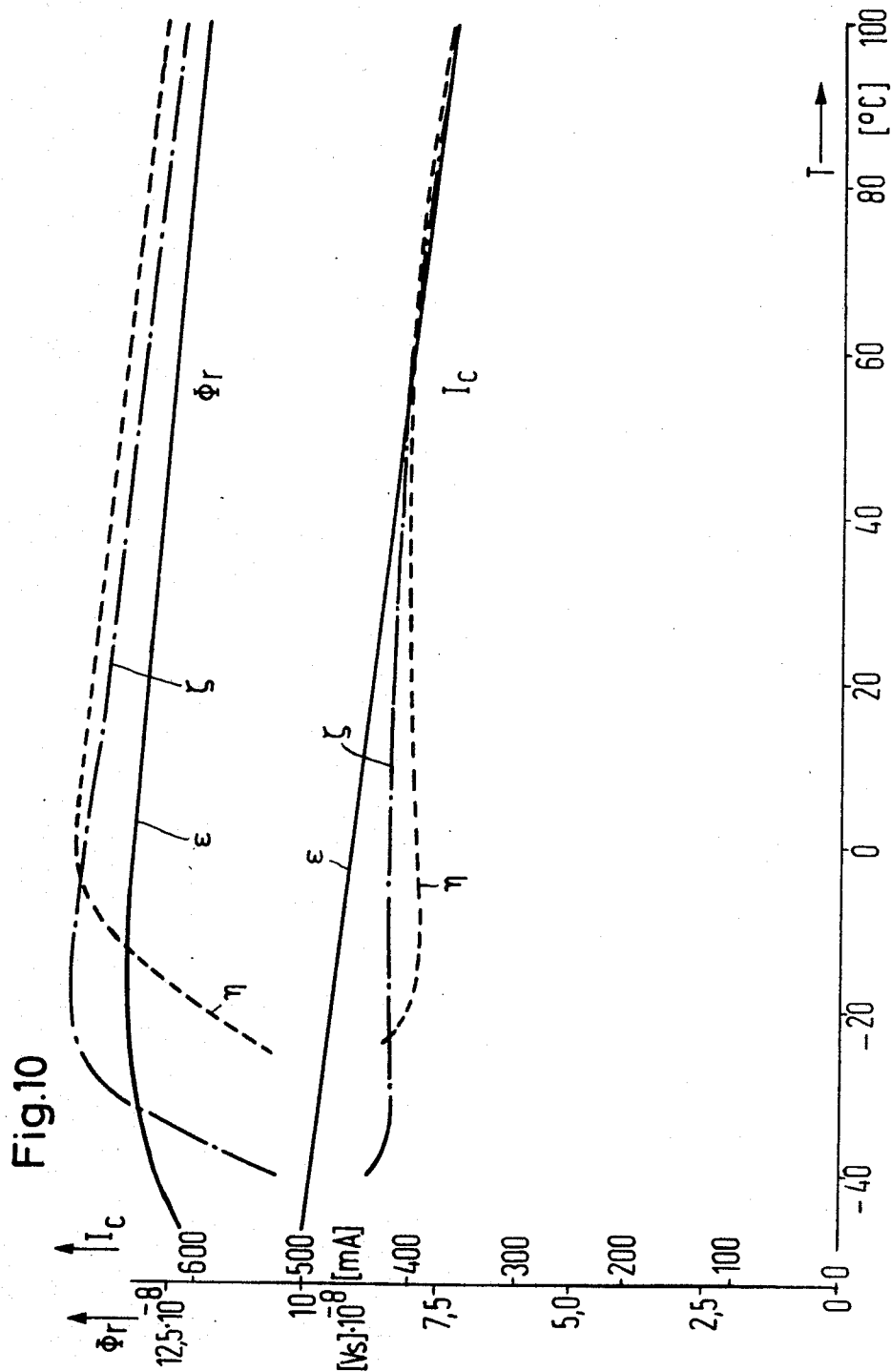

FIGS. 10 and 11 illustrate, on the one hand, the coercitive current and the remanence flux, and on the other hand, the dynamic switching characteristics of switching cores according to the invention with 3 mm. outer diameter, cobalt oxide being present in three different proportions. ε is applicable to a ferrite core which has 0.55% by weight of cobalt oxide, ζ is applicable to a corresponding ferrite core with 0.65% by weight of cobalt oxide and η is applicable to a corresponding ferrite core with 0.75% by weight of cobalt oxide. There the following measuring values are applicable: $I_f$=720 ma.; $I_p/I_f$=0.5; $T_r$=0.2 µs. From FIG. 10 it is apparent that through an increasing proportion of cobalt oxide the temperature constancy at lower temperatures becomes poorer, while in the range between about 0 and 80° C. it is better than corresponding ferrites with lesser amounts of cobalt oxide. The optimal cobalt oxide addition, therefore, will depend on the requirements as to whether or not the switching cores according to the invention are also to be utilized at temperatures of less than 0° C. For an operating temperature range from −20° C. to +100° C. a cobalt oxide addition of about 0.60 to 0.65% by weight has proved very favorable.

We claim:

1. A process for the production of ferromagnetic switching cores of cobalt containing, superstoichiometric nickel-zinc ferrite with a rectangular hysteresis loop for a great operating temperature range from about −20° C. to about +100° C. of material corresponding to Perminvar ferrites, comprising the steps of forming said ferrite core, sintering said core in air and cooling said core from a temperature $T_W$ between 1250° C. and 1000° C. to about room temperature $T_R$ in an oxygen-free, neutral atmosphere.

2. A process according to claim 1, wherein the cooling is carried out in less than 30 minutes.

3. A process according to claim 2, wherein the cooling is carried out in about 15 minutes.

4. A process according to claim 1, wherein the core is sintered in air at a sintering temperature $T_S$, cooling the core at a rate of about 180° C. per hour to a temperature $T_W$ between 1250° C. and 1000° C., and from such temperature $T_W$ to room temperature $T_R$ in nitrogen, at a rate of about 4400° C. per hour.

5. A process according to claim 1, wherein said sintered core is cooled in air to a temperature $T_W$ of about 1115° C.

6. A process according to claim 1, wherein the sintered and cooled ferrite core is heated to a temperature $T_W$ between 1250° C. and 1000° C., and cooled from this temperature $T_W$ to room temperature $T_R$ in nitrogen at a rate of about 4400° C. per hour.

7. A process according to claim 6 wherein said sintered and cooled core is reheated to about 1115° C. and then cooled at a rate of about 4400° C. per hour to a temperature of about 280° C., and then tempered in a magnetic field which is at least equal to the coercitive field strength of the ferrite for less than 4 hours.

8. A process according to claim 1, wherein the core, cooled in nitrogen, is tempered at a tempering temperature $T_T$ below the curie temperature, by several ten degrees, in a magnetic longitudinal field $H_T$, which is at least equal to the corercitive field strength $H_c$ of the ferrite, for less than four hours.

9. A process according to claim 6, wherein the step of tempering is terminated after about 30 minutes.

10. A process for the production of ferromagnetic switching cores from $Fe_2O_3$, NiO, ZnO and CoO comprising the steps of: compressing a composition in mol percent in a range of 50–65 $Fe_2O_3 \cdot$ 15–45 NiO $\cdot$ 5–35 ZnO+0.1–4% by weight of CoO into a toroidal core, heating said core to about 1300° C. and sintering said core thereat for 15 hours in the presence of air, cooling said core at a rate of 180° C./hr. in the presence of air to a critical turning temperature of about 1115° C., cooling said core in an oxygen-free atmosphere at a rate of about 4400° C./hr. to a temperature of about 280° C., and tempering said core at 280° C. for less than 4 hours.

11. A ferromagnetic switching core with rectangular hysteresis loop made of cobalt-containing, superstoichiometric nickel-zinc ferrite with a low temperature coefficient, of the remanence inductance and the coercitive field strength as well as of the switching time, of less than $5.10^{-3}/°$ C. over a temperature range of $-20°$ C. to $+100°$ C., characterized in that the ferrite has a coercitive field strength of less than 0.75 oe. with a remanence inductance of at least about 3 kg., and a composition as follows:

50–55 mol percent $Fe_2O_3$
24–32 mol percent NiO
15–25 mol percent ZnO
0.5–0.8% by weight CoO.

12. A switching core according to claim 11, with a composition as follows:

52.5–53.5 mol percent $Fe_2O_3$
26–30 mol percent NiO
17–21 mol percent ZnO
0.55–0.65% by weight of CoO.

References Cited

UNITED STATES PATENTS

| | | | |
|---|---|---|---|
| 3,032,503 | 5/1962 | Sixtus et al. | 252—62.62 |
| 2,989,472 | 6/1961 | Eckert et al. | 252—62.62 |
| 3,027,327 | 3/1962 | Blank | 252—62.56 |
| 3,055,832 | 9/1962 | Weisz | 252—62.62 |
| 3,242,089 | 3/1966 | Bartow et al. | 252—62.62 |

TOBIAS E. LEVOW, Primary Examiner

R. D. EDMONDS, Assistant Examiner